United States Patent [19]

Suzuki

[11] Patent Number: 4,788,585
[45] Date of Patent: Nov. 29, 1988

[54] APPARATUS FOR MEASURING SC/H PHASE OF COMPOSITE VIDEO SIGNAL

[75] Inventor: Mituyoshi Suzuki, Yokohama, Japan

[73] Assignee: Leader Electronics Corp., Kanagawa, Japan

[21] Appl. No.: 139,410

[22] Filed: Dec. 30, 1987

[30] Foreign Application Priority Data

Oct. 15, 1987 [JP] Japan .................................. 62-260445

[51] Int. Cl.$^4$ ............................................. H04N 17/02
[52] U.S. Cl. .......................................... 358/10; 358/19
[58] Field of Search .......................... 358/10, 19, 139; 324/83 R, 83 A, 83 D, 88, 121 R

[56] References Cited

U.S. PATENT DOCUMENTS

| | | | |
|---|---|---|---|
| 4,585,989 | 4/1986 | Matney | 324/83 D |
| 4,587,551 | 5/1986 | Penney | 358/10 |
| 4,603,346 | 7/1986 | Melling, Jr. | 358/10 |
| 4,680,620 | 7/1987 | Baker et al. | 358/10 |
| 4,694,324 | 9/1987 | Matney | 358/10 |

OTHER PUBLICATIONS

Catalog of Tektronix 1750, 1751 Models.
Catalog of Philips PM 5668 Model.
Catalog of Leitch SCH-730N/SCH-731 N Models.
Catalog of Kikusui 1527/1525 Models.

*Primary Examiner*—Howard W. Britton
*Attorney, Agent, or Firm*—Biebel, French & Nauman

[57] ABSTRACT

A measuring instrument for SC/H phase of a composite video signal is provided in which a phase comparison is made between at least a portion of a color burst extracted from the video signal and a continuous subcarrier frequency signal that is phase-locked to the leading edge of the horizontal sync pulse so as to determine the particular SC/H phase. The instrument includes a display device which provides a display concerning the measured SC/H phase in the form of characters and/or a waveform.

21 Claims, 4 Drawing Sheets

APPARATUS FOR MEASURING SC/H PHASE OF COMPOSITE VIDEO SIGNAL

FIELD OF INVENTION

The present invention relates to an SC/H phase measuring apparatus for measuring and displaying the SC/H phase of a composite video signal for color television.

PRIOR ART

Recently, it has become important to control the SC/H phase of a composite video signal when combining video signals from two or more channels by means of a switcher or in VTR editing. "SC/H phase" means the phase of a color subcarrier at its zero-crossing point to the leading edge (the 50% point of the sync level) of a horizontal sync signal. It has been realized that even a small error in the SC/H phase causes such phenomena as disorder of the picture in the form of, for example, jumping.

One of the representative examples of the various SC/H phase measuring instruments which have heretofore been made available is the phase difference measuring apparatus disclosed in Japanese Patent Application Public-Disclosure No. 60-235599. This prior art apparatus is arranged to include a burst-locked oscillator having a PLL circuit for the generation of a first continuous wave signal being phase-locked to the color burst of a composite video signal, and a sync-locked oscillator having a PLL circuit for the generation of second continuous wave signal of the subcarrier frequency that is phase-locked to the leading edge of a horizontal sync signal, whereby comparison between the phases of the two continuous waves can be performed. This prior art apparatus further includes a circuit which performs a vector display of the phase difference between the first and second continuous wave signals, that is, the SC/H phase, on the CRT.

In the prior art phase difference measuring apparatus, there is a problem in that the measurement of the SC/H phase is limited by the use of the two PLL circuits and in that it is impossible to detect faster components in phase jitters, because the PLL circuits are required to have a substantially large time constant as compared with the cycle of the subcarrier for the sake of stable oscillation, which, on the other hand, would bring about suppression of the fast phase jitters. Further, the presence of the PLL circuit is likely to cause other jitters to occur in the PLL loop. These factors make it difficult to perform phase measurement with higher precision.

The prior art apparatus mentioned above also adopts a vector-format display for display of the SC/H phase. When the phase jitters are larger or have faster components, however, the vector display involves the problem that a large amount of fluttering of the displayed vector occurs and thus it is hard to speedily and accurately read the SC/H phase from the CRT screen.

Therefore, an object of the present invention is to provide a method of and apparatus for the measurement of an SC/H phase which are capable of measuring the SC/H phase with higher precision.

Another object of the present invention is to provide an SC/H phase measuring apparatus which is capable of displaying the measured SC/H phase in an easily readable form.

SUMMARY OF INVENTION

The above-mentioned objects are accomplished by the present invention which provides an SC/H phase measuring apparatus which comprises: burst extracting means connected to receive said composite video signal for extracting a subcarrier burst from said composite video signal to output the extracted subcarrier burst; oscillating means connected to receive said composite video signal for generating a horizontal sync phase-locked signal of a subcarrier frequency that is phase-locked to the leading edge of a horizontal sync pulse of said composite video signal; phase difference detecting means connected to receive said subcarrier burst and said horizontal sync phase-locked signal for comparing the phase of said subcarrier burst with the phase of said horizontal sync phase-locked signal to generate a phase difference signal representative of the phase difference therebetween; and display means connected to receive said phase difference signal for providing a display of the SC/H phase in response to said phase difference signal.

According to the present invention, said display means may include, for the purpose of providing the display of the SC/H phase in characters, character signal generating means adapted to receive said phase difference signal for generating a character signal representative of the phase difference. Also, said display means may include waveform display signal generating means adapted to receive said phase difference signal for generating a signal for waveform display of phase jitters of the SC/H phase.

Further, according to the present invention, there is provided a method of measuring an SC/H phase of a composite video signal, which comprises the steps of: extracting a subcarrier burst from said composite video signal to output the extracted subcarrier burst; separating a horizontal sync pulse from said composite video signal; generating a horizontal sync phase-locked signal of a subcarrier frequency being phase-locked to the leading edge of the horizontal sync pulse; comparing the phase of said subcarrier burst with the phase of said horizontal sync phase-locked signal to generate a phase difference signal representative of the phase difference therebetween; and providing a display of the SC/H phase in response to said phase difference signal.

The present invention will now be more fully described with reference to the embodiment of the present invention and the associated drawings.

BRIEF DESCRIPTION OF DRAWINGS

FIGS. 3 and 4 are waveform diagrams showing the waveforms of signals appearing at various points in the circuit of FIG. 2, in which FIG. 3 shows the timing of several signals during a portion of one horizontal period, and FIG. 4 shows the timing of several signals during a time period including a few fields.

DETAILED DESCRIPTION OF INVENTION

Figure 1:
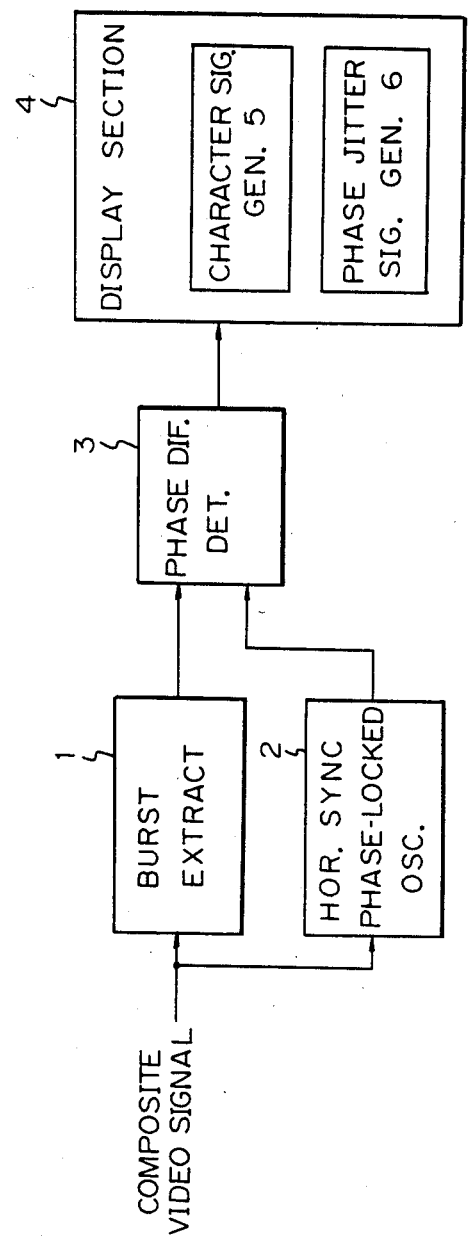
FIG. 1 is a block diagram showing the basic structure of an SC/H phase measuring instrument according to the present invention.

Referring to FIG. 1 which shows the general structure of an SC/H phase measuring instrument of the present invention, the SC/H phase measuring instrument comprises a burst extracting section 1, an oscillating section 2, a phase difference detecting section 3 and a display section 4. The burst extracting section 1 operates to extract a subcarrier burst from a composite video signal so as to output the subcarrier burst. The oscillating section 2 is operative to generate a horizontal sync phase-locked signal of a subcarrier frequency which is phase-locked to the leading edge of a horizontal sync pulse of the composite video signal. The phase difference detecting section 3 operates to compare the phase of the subcarrier burst with the phase of the horizontal sync phase-locked signal so as to generate a phase difference signal representative of the difference in phase between them. The display section 4 is connected to receive the phase difference signal and operates to provide a display of the SC/H phase.

Also, the display section 4 in the SC/H phase measuring instrument may include a character signal generating section 5 which is operative to generate a character signal representative of the phase difference. Furthermore, the display section 4 may include a phase jitter signal generating section 6 which is operative to receive the phase difference signal and generate a signal for waveform display of phase jitter of the SC/H phase.

The SC/H phase measuring instrument according to the present invention which has the structure described above operates to extract the color burst and compare it in phase directly with the horizontal sync phase-locked signal without having the color burst subjected to any distortion of the kind that would be caused by a time constant circuit such as a PLL circuit.

Further, the character signal generating section 5 of the display section 4 operates to convert the phase difference signal into a character signal so as to provide a display of a numerical value which allows visual reading as to the quantity of the SC/H phase to be conducted with ease. Furthermore, since the display section 4 includes the phase jitter signal generating section 6, the section 4 operates to provide a display as to any variation in the jitter component of the SC/H phase with time in a easily readable manner.

An embodiment of the SC/H phase measuring instrument according to the present invention will now be described in detail.

Figure 2:
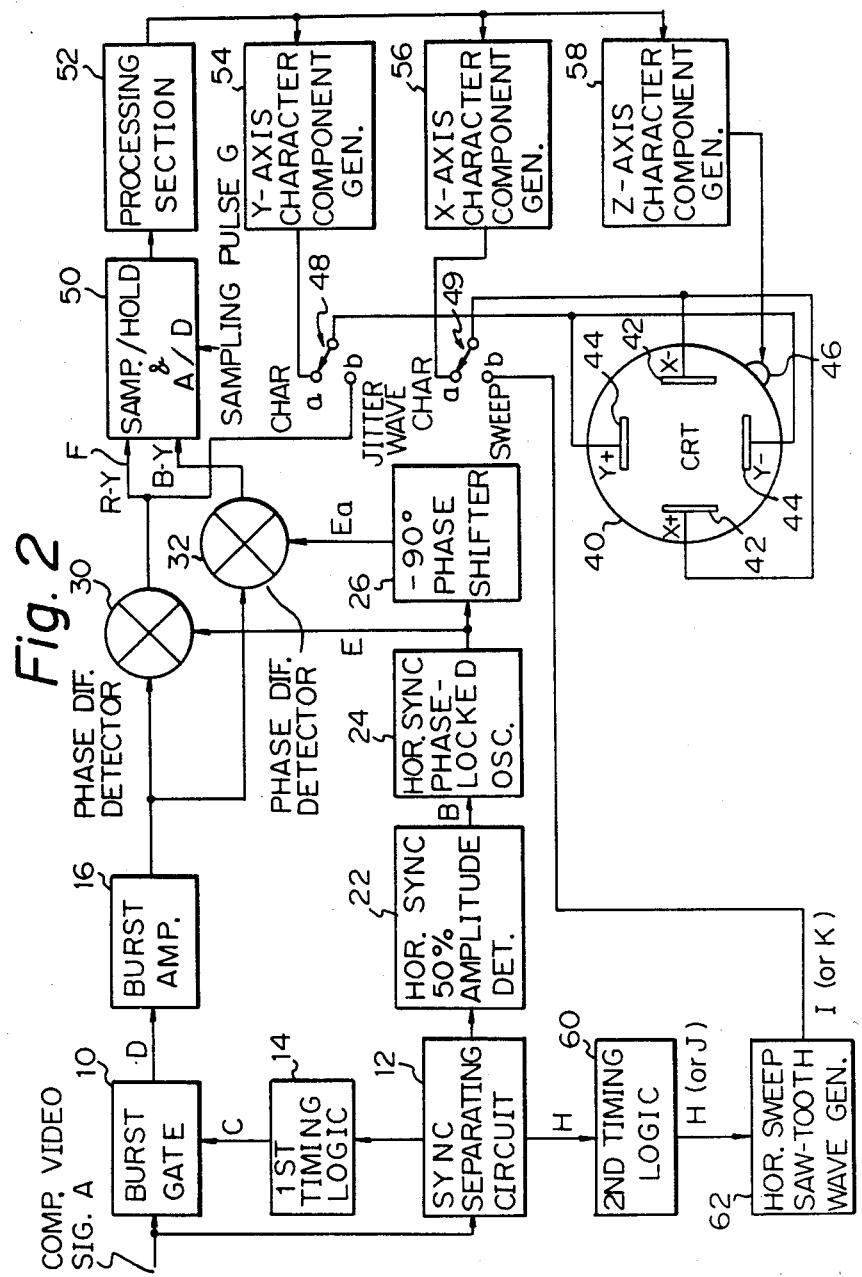
FIG. 2 is a block diagram showing the circuit of an embodiment of the SC/H phase measuring instrument according to the present invention.
Figure 3:
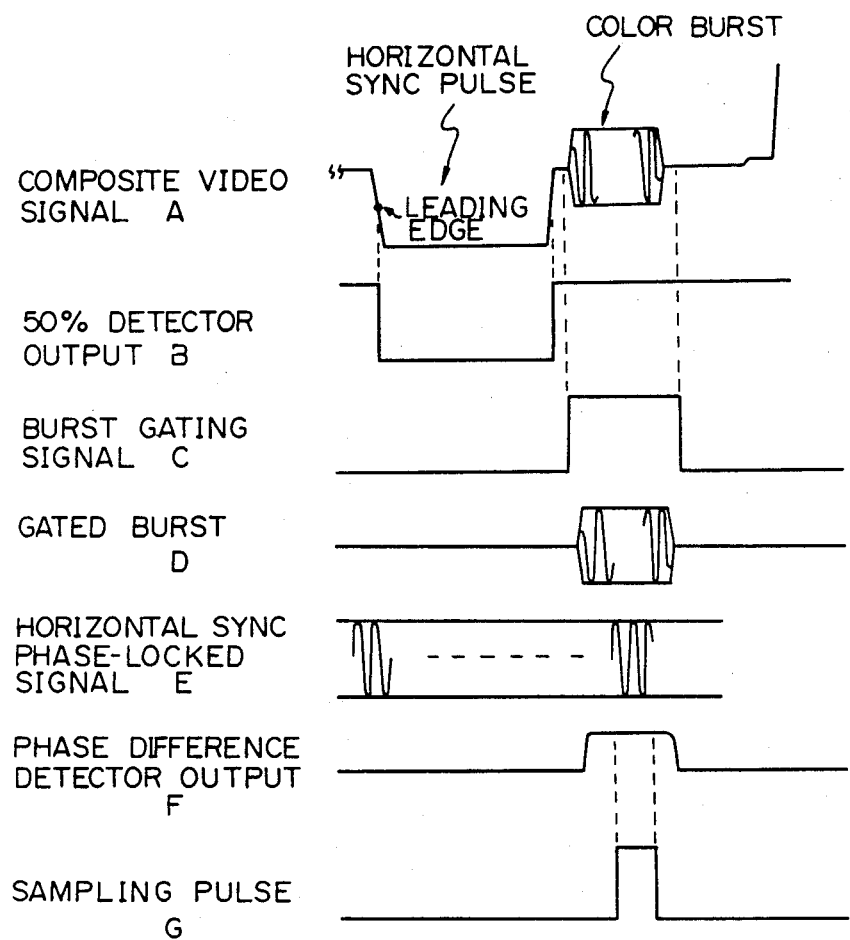

FIG. 2 is a schematic circuit diagram of an embodiment of the SC/H phase measuring instrument, in which a burst gate 10 and a sync separating circuit 12 are connected so as to receive a composite video signal A, the SC/H phase of which is to be measured. This composite video signal A has a horizontal sync pulse portion and a following color burst portion, as shown in FIG. 3.

The sync separating circuit 12 is a known circuit which is arranged to separate a horizontal sync pulse (not shown, but similar in waveform to the wave B in FIG. 3) and a vertical sync pulse H (FIG. 4) from the composite video signal A. A first timing logic 14 is connected to receive the separated horizontal sync pulse, and the logic 14 comprises a monostable circuit which generates a burst gating signal C (FIG. 3) which is high for a predetermined period following a given fixed time after the fall of the horizontal sync pulse. This high period is adjusted so as to be coincident with at least a portion of the color burst of the signal A. In the example shown in FIG. 3, the high period is selected to include the whole color burst. The burst gate 10 is connected to receive the burst gating signal C, and the gate 10 is energized to pass the composite video signal A only during the high period of the signal C so that the color burst D (FIG. 3) extracted thereby appears at its output. The following burst amplifier 16 is connected to the burst gate 10 and amplifies the color burst D so as to be adapted for the succeeding phase comparison.

A horizontal sync 50% amplitude detecting circuit 22 is connected to receive the composite video signal and the separated horizontal sync pulse from the sync separating circuit 12, and the detecting circuit 22 is a circuit which accurately detects the 50% point of the amplitude, that is, the leading edge of the horizontal sync pulse of the composite video signal. This circuit generates the output B (FIG. 3) which falls to a low level at the 50% point of the fall of the horizontal sync pulse of the composite video signal and rises to a high level at the 50% point of the rise of the horizontal sync pulse. The separated horizontal sync pulse is used for the timing in the detecting circuit 22. A horizontal sync phase-locked oscillator 24 is connected to receive the detector output B, and the oscillator 24 comprises a PLL circuit which oscillates at the subcarrier frequency of 3.58 MHz and is operative to generate a horizontal sync phase-locked signal E which is accurately phase-locked to the fall of the detector output B, that is, to the leading edge of the horizontal sync pulse. A $-90°$ phase shifter 26 is connected in succession to the oscillator 24, and the shifter 26 is operative to generate another horizontal sync phase-locked signal Ea (not shown) by phase-shifting the signal E by 90°.

Also provided is a pair of phase difference detectors 30, 32, each of which comprises a multiplier and a low-pass filter. One of the phase difference detectors 30 is used to form an R-Y phase difference signal F by phase-comparing the color burst D, which has been gated by the burst gate 10 and amplified by the burst amplifier 16, with the horizontal sync phase-locked signal E, while the other phase difference detector 32 is used to form a B-Y phase difference signal (not shown in FIG. 3) by phase-comprising the color burst D with the other phase-locked signal Ea.

Specifically, if the subcarrier angular frequency is represented as $\omega$ and the phase difference is represented as $\theta$, the multipliers of the phase difference detectors 30 and 23 perform the following multiplications, respectively:

$$R\text{-}Y:$$
$$\sin \omega t \times \sin (\omega t + \theta) =$$
$$1/2 \cos\theta - 1/2 \cos (2\omega t + \theta)$$

$$B\text{-}Y:$$
$$\sin \omega t \times \sin (\omega t + \pi/2 + \theta) =$$
$$-1/2 \sin\theta + 1/2 \sin (2\omega t + \theta)$$

The low-pass filters of the phase difference detectors 30 and 32 respectively eliminate the $2\omega t$ components of these equations and, accordingly, the $\cos\theta$ component and the $\sin\theta$ component are obtained at the outputs R-Y and B-Y, respectively, of the phase difference detectors 30 and 32. An example of the R-Y phase difference signal F is shown in FIG. 3.

The instrument of the present invention includes as a display section of CRT 40 which includes, as shown in FIG. 2, X-axis deflection plates 42, Y-axis deflection plates 44 and an intensity control 46. The CRT 40 is an example of a device which allows display of both characters and waveforms.

To display characters concerning the SC/H phase on the CRT 40, a sample/hold and A/D converter section 50, a processing section 52, a Y-axis character component generator 54, an X-axis character component generator 56 and a Z-axis character component generator 48 are provided. Also, for the display of the jitter waveform of the SC/H phase on the CRT 40, a second timing logic 60 and a horizontal sweep saw-tooth wave generator 62 are provided. Switches 48 and 49 are provided for switching between a character display mode on the side a and a jitter waveform display mode on the side b.

The character display section will now be described in detail. The sample/hold and A/D converter section 50 is connected to receive the outputs R-Y and B-Y of the detectors 30 and 32, respectively, and the section 50 is operative to sample these outputs in response to the sampling pulse G (FIG. 3) and convert them into digital signals. The sampling pulse G is, as seen from FIG. 3, positioned in time at the center of the signal portion (or color burst) of the phase difference detector output F representing the phase difference signal, and the width of the sampling pulse G is made to be such that at least a portion of the signal may be sampled. The sampling pulse G is generated by the sync separating circuit 12.

A pair of digital outputs R-Y and B-Y from the converter 50 are applied to the processing section 52 comprised by CPU which performs averaging and arithmetic operations. Specifically, the processing section 52 averages each of the digital outputs over several frames so that the jitter components are eliminated and thus the numerical value to be displayed may be kept stable without rapid changes. The pair of averaged digital values R-Y and B-Y are then used to calculate the phase difference $\theta$ from the following formula:

$$\theta = \tan^{-1} (R-Y/B-Y)$$

In this calculation, the table-look-up technique is used to allow for higher speeds. In other words, values $\theta$ for various values of the input parameters R-Y and B-Y of the above formula are tabulated and stored in advance in the memory of the CPU so that, when actual digital values for the parameters R-Y and B-Y are received, the corresponding value of $\theta$ is looked up from the table. The processing section 52 outputs a character signal representative of the angle of the value $\theta$ looked up.

The character signal is applied to the Y-axis, X-axis and Z-axis character component generators 54, 56 and 58 which generate Y-axis, X-axis and Z-axis character component signals, respectively, which are required to display the character on the CRT 40. The Y-axis character component signal and the X-axis character component signal are input through the switches 48 and 49 to their corresponding deflection plates 44 and 42, respectively, of the CRT, while the Z-axis character component signal is applied to the intensity control 46.

Figure 4:
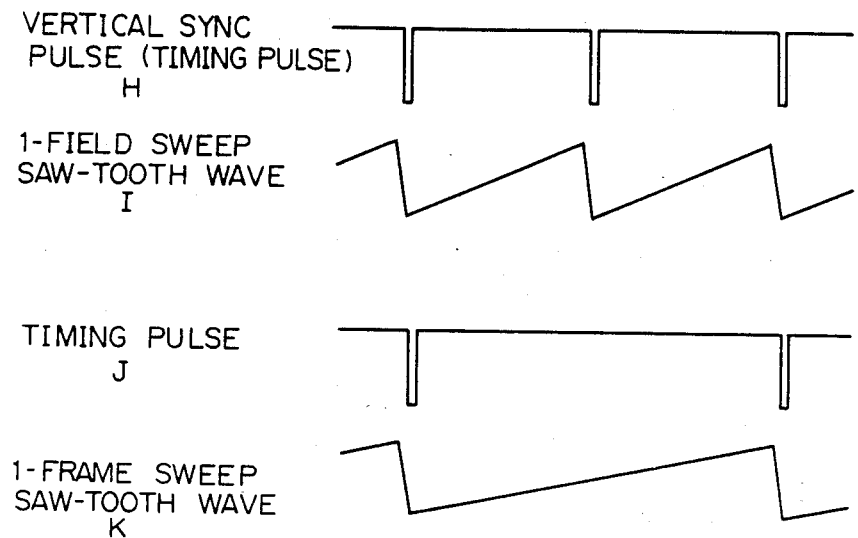

Next, the jitter waveform display section will be described in detail. The second timing logic 60 receives the vertical sync pulse H from the sync separating circuit 12. When one-field sweep mode for displaying the waveform of the phase jitter over one field is selected, the logic 60 outputs the vertical sync pulses H directly as timing pulses H (FIG. 4). On the other hand, when one-frame sweep mode for displaying the waveform of the phase jitter over one frame (=two fields) is selected, the logic 60 outputs timing pulses J (FIG. 4) which include every other vertical sync pulse. The timing pulses H or J are applied to the horizontal sweep saw-tooth wave generator 62 which is triggered at the time of falling of the timing pulse to form a saw-tooth wave I or K (FIG. 4) for horizontal sweep of the CRT. For jitter waveform display, the saw-tooth wave is applied through the switch 49 to the X-axis deflection plates 42 of the CRT 40, while the output of either one of the phase difference detectors 30 and 32 (R-Y in the illustrated example) is applied through the switch 48 to the Y-axis deflection plates 44.

The operation of the instrument according to the present invention will now be described with reference to an example of the display of FIG. 5.

When the character display mode is selected by turning the switches 48 and 49 to the sides a, phase difference signals R-Y and B-Y which have been obtained by comparing in phase a gated and amplified color burst D with a phase-locked signals E and Ea, are sampled and converted from analogue to digital by the circuit 50, and the resulting digital outputs are averaged over several frames by the processing section 52. The averaged outputs are used to calculate a value $\theta$ representative of the phase difference, which is then converted into a character signal representative of the value. The character signal is then converted into the character component signals by the generators 54, 56 and 58 which are in turn input to the CRT 40. An example of the character display of the SC/H phase on the CRT 40 is, as shown in FIG. 5, "SCH+17°" on the upper right corner of the screen. At this time, no jitter waveform is displayed.

Then, when the jitter waveform display mode is selected by turning the switches 48 and 49 to the sides b, a phase difference signal R-Y and a saw-tooth wave are applied to the CRT 40, the latter having the cycle depending upon whether the one-field sweep mode or the one-frame sweep mode is being utilized. The waveform displayed at this time may be one such as that shown in FIG. 5 in which a number of dots corresponding to the number of horizontal periods within one field or one frame are arranged substantially in the horizontal direction, each of the dots corresponding to the R-Y value of one of the horizontal periods. By this waveform, the variation of the phase during one field or one frame is displayed.

Figure 5:
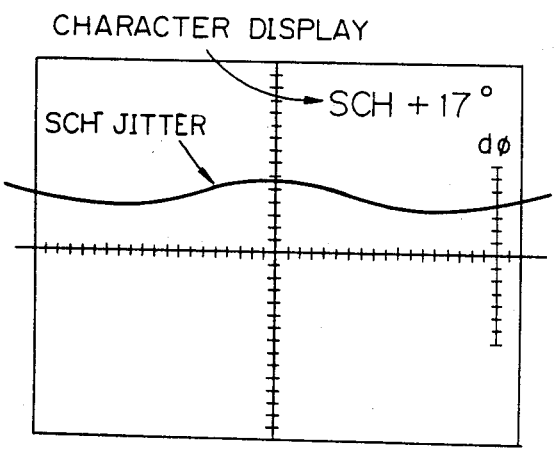
FIG. 5 shows an example of a display on the CRT 40 of FIG. 2.

Lastly, in the character/jitter waveform display mode, the switches 48 and 49 are switched between the sides a and b at high speed so that characters and a waveform are displayed substantially at the same time on the CRT 40, as shown in FIG. 5. By this means, the average value of the SC/H phase is accurately displayed in characters, and at the same time the jitters of the SC/H phase with time are displayed in a waveform on the CRT 40.

While the SC/H phase measuring instrument according to the present invention has been described in detail with reference to a specific embodiment, the following modifications can be made within the scope of the present invention. In the first modification of the present invention, either the phase shifter 26 and the phase difference detector 32, or the phase difference detector 30 may be omitted so that the phase difference signal of the sole phase difference detector being left is sampled and held and then A/D converted and also so that the processing section 52 performs the foloowing arithmetic operation:

$$\theta = \cos^{-1} 2(R-Y) \text{ or}$$

$$\theta = \sin^{-1} 2(B-Y)$$

In the second modification of the present invention, the phase difference signals R-Y and B-Y may be used to provide a vector display on the CRT 40 in a well known manner.

According to the SC/H phase measuring instrument of the present invention as described hereinabove, a more accurate measurement of the SC/H phase can be achieved. Also, the display of the results of measurement in characters facilitates accurate reading. Furthermore, the combination of the character display and the jitter waveform display enables simultaneous reading of an average value of the SC/H phase and its jitter components.

What is claimed is:

1. An SC/H phase measuring apparatus for measuring an SC/H phase of a composite video signal, comprising:
   a. burst extracting means connected to receive said composite video signal for extracting a subcarrier burst from said composite video signal to output the extracted subcarrier burst;
   b. oscillating means connected to receive said composite video signal for generating a horizontal sync phase-locked signal of a subcarrier frequency that is phase-locked to the leading edge of a horizontal sync pulse of said composite video signal;
   c. phase difference detecting means connected to receive said extracted subcarrier burst and said horizontal sync phase-locked signal for comparing a phase of said extracted subcarrier burst with a phase of said horizontal sync phase-locked signal to generate a phase difference signal representative of the phase difference therebetween; and
   d. display means connected to receive said phase difference signal for providing a display of the SC/H phase in response to said phase difference signal.

2. An apparatus according to claim 1, wherein said burst extracting means includes:
   timing logic means connected to receive said composite video signal for generating a gating signal during a time period including at least a portion of the subcarrier burst contained in said composite video signal; and
   burst gating means connected to receive said composite video signal and said gating signal for operating to pass said composite video signal to output said extracted subcarrier burst during a time period within which the burst gating means is enabled by said gating signal.

3. An apparatus according to claim 1, characterized in that:
   said horizontal sync phase-locked signal generated by said oscillating means comprises a pair of first and second horizontal sync phase-locked signals, said first horizontal sync phase-locked signal being a signal of the subcarrier frequency that is phase-locked to the leading edge of said horizontal sync pulse, and said second horizontal sync phase-locked signal being a signal of the subcarrier frequency that is shifted in phase by 90° from said first horizontal sync phase-locked signal; and
   said phase difference signal generated by said phase difference detecting means comprises a pair of first and second phase difference signals, said first phase difference signal being a signal representative of a phase difference between said extracted subcarrier burst and said first horizontal sync phase-locked signal, and said second phase difference signal being a signal representative of a phase difference between said extracted subcarrier burst and said second horizontal sync phase-locked signal.

4. An apparatus according to claim 1, wherein said display means includes waveform display generating means adapted to receive said phase difference signal for generating a signal for waveform display of phase jitters of the SC/H phase.

5. An apparatus according to claim 4, wherein said display means includes a CRT, and wherein said waveform display signal generating means includes a sweep saw-tooth wave generating means for generating a sweep saw-tooth wave having a cycle including at least one vertical period.

6. An apparatus according to claim 1, wherein said display means includes:
   character signal generating means adapted to receive said phase difference signal for generating a character signal representing the phase difference; and
   waveform display signal generating means adapted to receive said phase difference signal for generating a signal for waveform display of phase jitters of the SC/H phase.

7. An apparatus according to claim 6, wherein said display means further includes:
   a CRT; and
   switching means for selectively supplying said character signal and the signal from said waveform display signal generating means to said CRT.

8. An apparatus according to claim 1, wherein said display means includes, for the purpose of providing the display of the SC/H phase in characters, character signal generating means adapted to receive said phase difference signal for generating a character signal representative of the phase difference.

9. An apparatus according to claim 8, wherein said character signal generating means comprises:
   A/D converting means adapted to receive said phase difference signal for performing A/D conversion of the phase difference signal to generate a phase difference digital signal;
   averaging means for averaging a predetermined number of said phase difference digital signals to generate an averaged phase difference digital signal; and
   output means for outputting from said averaged phase difference digital signal a corresponding phase difference character signal representative of the phase difference.

10. An apparatus according to claim 9, wherein said display means includes a CRT, and wherein said character signal generating means includes means for generating a signal for CRT display from said phase difference character signal received from said output means.

11. An SC/H phase measuring apparatus for measuring an SC/H phase of a composite video signal, comprising:

a. burst extracting means connected to receive said composite video signal for extracting a subcarrier burst from said composite video signal to output the extracted subcarrier burst;
b. oscillating means connected to receive said composite video signal for generating a pair of first and second horizontal sync phase-locked signals of a subcarrier frequency that is phase-locked to the leading edge of a horizontal sync pulse of said composite video signal, said second horizontal sync phase-locked signal being shifted in phase by 90° from said first horizontal sync phase-locked signal;
c. phase difference detecting means connected to receive said extracted subcarrier burst and said pair of first and second horizontal sync phase-locked signal for comparing a phase of said extracted subcarrier burst with phases of said pair of first and second horizontal sync phase-locked signals to generate a pair of first and second phase difference signals, said first phase difference signal being signal representative of the phase difference between said extracted subcarrier burst and said first horizontal sync phase-locked signal, and said second phase difference signal being a signal representative of the phase difference between said extracted subcarrier burst and said second horizontal sync phase-locked signal; and
d. display means connected to receive said pair of first and second phase difference signals for providing a display of the SC/H phase in response to said pair of first and second phase difference signals.

12. An apparatus according to claim 11, wherein said burst extracting means includes:
   timing logic means connected to receive said composite video signal for generating a gating signal during a time period including at least a portion of the subcarrier burst contained in said composite video signal; and
   burst gating means connected to receive said composite video signal and said gating signal for operating to pass said composite video signal to output said extracted subcarrier burst during a time period when the burst gating means is enabled by said gating signal.

13. An apparatus according to claim 11, wherein said display means includes means adapted to receive said pair of first and second phase difference signals for generating a signal for displaying the SC/H phase in vector.

14. An apparatus according to claim 11, wherein said display means includes waveform display signal generating means adapted to receive said first and second phase difference signal for generating a signal for waveform display of phase jitters of the SC/H phase.

15. An apparatus according to claim 14, wherein said display means includes a CRT, and wherein said waveform display signal generating means includes a sweep saw-tooth wave generating means for generating a sweep saw-tooth wave having a cycle including at least one vertical period.

16. An apparatus according to claim 11, wherein said display means includes:
   character signal generating means adapted to receive said pair of first and second phase difference signals for generating a character signal representing the phase difference; and
   waveform display signal generating means adapted to receive one of said first and second phase difference signals for generating a signal for waveform display of phase jitters of the SC/H phase.

17. An apparatus according to claim 16, wherein said display means further includes:
   a CRT; and
   switching means for selectively supplying said character signal and the signal from said waveform display signal generating means to said CRT.

18. An apparatus according to claim 11, wherein said display means includes, for the purpose of providing the display of the SC/H phase in characters, character signal generating means adapted to receive said pair of first and second phase difference signals for generating a character signal representative of the phase difference.

19. An apparatus according to claim 18, wherein said character signal generating means includes:
   A/D converting means adapted to receive said pair of first and second phase difference signals for performing A/D conversion of said first and second phase difference signals to generate first and second phase difference digital signals, respectively;
   averaging means for averaging a predetermined number of each of said first and second phase difference digital signals to generate first and second averaged phase difference digital signals; and
   output means for outputting from said first and second averaged phase difference digital signals a corresponding phase difference character signal representative of the phase difference.

20. An apparatus according to claim 19, wherein said display means includes a CRT, and wherein said character signal generating means includes means for generating a signal for CRT display from said phase difference character signal received from said output means.

21. A method for measuring an SC/H phase of a composite video signal, comprising the steps of:
   a. extracting a subcarrier burst from said composite video signal to output the extracted subcarrier burst;
   b. separating a horizontal sync pulse from said composite video signal;
   c. generating a horizontal sync phase-locked signal of a subcarrier frequency that is phase-locked to the leading edge of the horizontal sync pulse;
   d. comparing a phase of said extracted subcarrier burst with a phase of said horizontal sync phase-locked signal to generate a phase difference signal representative of the phase difference therebetween; and
   e. providing a display of the SC/H phase in response to said phase difference signal.

* * * * *